(12) United States Patent
Watanabe et al.

(10) Patent No.: US 10,466,271 B2
(45) Date of Patent: Nov. 5, 2019

(54) SCANNING PROBE MICROSCOPE AND OPTICAL AXIS ADJUSTMENT METHOD FOR SCANNING PROBE MICROSCOPE

(71) Applicant: HITACHI HIGH-TECH SCIENCE CORPORATION, Minato-ku, Tokyo (JP)

(72) Inventors: Masafumi Watanabe, Tokyo (JP); Toshihiro Ueno, Tokyo (JP); Susumu Ito, Tokyo (JP); Shoichi Hasegawa, Tokyo (JP)

(73) Assignee: Hitachi High-Tech Science Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/249,474

(22) Filed: Aug. 29, 2016

(65) Prior Publication Data

US 2017/0059609 A1    Mar. 2, 2017

(30) Foreign Application Priority Data

Sep. 1, 2015   (JP) .................................. 2015-171866

(51) Int. Cl.
  *G01Q 20/02*   (2010.01)
(52) U.S. Cl.
  CPC .................................... *G01Q 20/02* (2013.01)
(58) Field of Classification Search
  USPC ........................................................... 850/6
  See application file for complete search history.

(56) References Cited

U.S. PATENT DOCUMENTS

| | | | | |
|---|---|---|---|---|
| RE37,299 E | * | 7/2001 | Amer | ..................... B82Y 35/00 250/306 |
| 7,089,787 B2 | * | 8/2006 | Sahin | ..................... B82Y 35/00 73/105 |
| 7,247,827 B1 | * | 7/2007 | Hwang | .................. B82Y 35/00 250/201.5 |
| 7,614,287 B2 | * | 11/2009 | Iyoki | ..................... G01Q 10/04 73/105 |
| 8,321,960 B2 | * | 11/2012 | Ito | .......................... G01Q 30/06 850/1 |
| 8,813,261 B2 | * | 8/2014 | Iyoki | ..................... G01Q 10/00 73/105 |

FOREIGN PATENT DOCUMENTS

| | | |
|---|---|---|
| JP | 2012-225722 | 11/2012 |
| JP | 2014-044144 | 3/2014 |

* cited by examiner

*Primary Examiner* — Phillip A Johnston
(74) *Attorney, Agent, or Firm* — Banner & Witcoff, Ltd.

(57) ABSTRACT

A scanning probe microscope includes: a cantilever; a cantilever supporting portion; a movement mechanism that moves a position of the cantilever; a light source that emits detection light; a detector that receives the detection light reflected on a reflecting surface of the cantilever; an objective lens; and a controller that controls the movement mechanism to perform a process including: detecting a spot position of a spot light of the detection light; detecting a position of the cantilever from an image captured by the imaging device; and controlling the movement mechanism based on the spot position, the position of the cantilever, an incident angle of the detection light, and the attachment angle such that the detection light is reflected on the reflecting surface when the cantilever is attached to the cantilever supporting portion.

3 Claims, 8 Drawing Sheets

SCANNING PROBE MICROSCOPE AND OPTICAL AXIS ADJUSTMENT METHOD FOR SCANNING PROBE MICROSCOPE

CROSS-REFERENCE TO RELATED APPLICATION

This application claims priority from Japanese Patent Application No. 2015-171866, filed on Sep. 1, 2015, the entire subject matter of which is incorporated herein by reference.

BACKGROUND

1. Field of the Invention

The present invention relates to a scanning probe microscope which measures various physical properties such as the surface shape or viscoelasticity of a sample through a scanning with a probe approaching the surface of the sample, and an optical axis adjustment method for the scanning probe microscope.

2. Description of the Related Art

A scanning probe microscope (SPM) measures the surface shape of a sample with a probe, which is attached to the tip of a cantilever, approximate to or brought in contact with the surface of the sample. It is known that an optical lever type SPM, in which laser light is emitted on the back surface of the tip of the cantilever, and reflecting light thereof is detected, is adopted as the scanning probe microscope. In the optical lever type SPM, a positional deviation of the reflecting light of the light emitted on the cantilever is detected as the displacement of the cantilever, and the surface of the sample is scanned while performing a feedback control to keep a displacement quantity of the cantilever constant. A feedback control signal is used for calculating a height or a physical property of the sample, and the physical property such as the surface shape or viscoelasticity of the sample can be measured.

In the optical lever type SPM, the laser light should accurately focus on the cantilever such that the intensity of the reflecting light reflected from the cantilever is maximized. There is a need to perform an "optical axis adjustment" in which the position of a detector detecting the reflecting light is adjusted. In this regard, a configuration is developed in which an optical microscope and a video camera are provided immediately above the cantilever, a beam splitter is disposed on the optical axis of the optical microscope, and the laser light emitted from a side is led downward through the beam splitter and emitted on the cantilever. An example of such configuration is disclosed in JP-A-2012-225722. According to such configuration, the position of the laser light can be directly checked with the optical microscope since a part of the laser light is directed upward through the beam splitter, and thus the optical axis adjustment is facilitated.

In a case where the laser light is obliquely emitted on the cantilever, the spot position of the laser light which can be checked with the optical microscope is not matched with the position of the laser light which is actually emitted on the cantilever, and further the laser light emitted on the cantilever cannot be directly viewed with the optical microscope. Accordingly, there is a problem that the optical axis adjustment should be performed by instinct, and a skill is required. In this regard, a configuration is developed in which the laser light emitted on the cantilever can be viewed by providing an auxiliary emission surface for helping the observation image of the optical microscope which comes into focus under the cantilever, and thus the optical axis adjustment is facilitated. An example of such configuration is disclosed in JP-A-2014-044144.

However, in the case of the configuration described in JP-A-2012-225722, the beam splitter (reflecting portion) is disposed on the optical axis of the optical microscope and blocks the center of the optical axis of the optical microscope, and thus there may be a problem that a resolution performance of the microscope is degraded. This configuration cannot be applied to a scanning probe microscope which obliquely emits the laser light on the cantilever.

In the case of the configuration described in JP-A-2014-044144, it is necessary to provide the auxiliary emission surface, and thus there may be a problem that an apparatus is complicated or is difficult to be miniaturized. It is still necessary to be skilled or take time for the optical axis adjustment since an operator manually performs the optical axis adjustment while viewing the laser light.

SUMMARY

The present disclosure has been made in view of the above-described circumstances, and one of objects of the present disclosure is to provide a scanning probe microscope which automatically performs an optical axis adjustment of an optical lever by using an objective lens disposed in a scanning probe microscope.

According to an exemplary embodiment of the present disclosure, there is provided a scanning probe microscope including: a cantilever that includes a reflecting surface that reflects light and a probe to be approximate to a surface of a sample; a cantilever supporting portion to which the cantilever is attached and supports the cantilever at a predetermined attachment angle with respect to a horizontal plane; a movement mechanism that moves a position of the cantilever; a light source that emits detection light; a detector that receives the detection light reflected on the reflecting surface of the cantilever and detects a position and a displacement of the cantilever based on the received detection light; an objective lens that is provided at a position facing the cantilever for capturing an image of a vicinity of the cantilever through the objective lens; and a controller that controls the movement mechanism to perform a process including: detecting a spot position of a spot light of the detection light captured through the objective lens in a state where the cantilever is not attached to the cantilever supporting portion; detecting a position of the cantilever from an image captured through the objective lens; and controlling the movement mechanism based on the spot position, the position of the cantilever, an incident angle of the detection light, and the attachment angle such that the detection light is reflected on the reflecting surface when the cantilever is attached to the cantilever supporting portion.

According to another exemplary embodiment of the present disclosure, there is provided an optical axis adjustment method for a scanning probe microscope including: a cantilever that includes a reflecting surface that reflects light and a probe to be approximate to a surface of a sample; a cantilever supporting portion to which the cantilever is attached and supports the cantilever at a predetermined attachment angle with respect to a horizontal plane; a movement mechanism that moves a position of the cantilever; a light source that emits detection light; a detector that receives the detection light reflected on the reflecting surface of the cantilever and detects a position and a displacement of the cantilever based on the received detection light; and an objective lens that is provided at a position facing the cantilever for capturing an image of a vicinity of the cantilever through the objective lens. The method includes: detecting a spot position of a spot light of the detection light captured through the objective lens in a state where the cantilever is not attached to the cantilever supporting portion; detecting a position of the cantilever from an image captured through the objective lens; and geometrically calculating an attachment position of the cantilever based on the spot position, the position of the cantilever, an incident angle of the detection light, and the attachment angle such that the detection light is reflected on the reflecting surface when the cantilever is attached to the cantilever supporting portion; and attaching the cantilever to the cantilever supporting portion by controlling the movement mechanism such that the cantilever moves to the attachment position.

DETAILED DESCRIPTION

Hereinafter, an embodiment of the present disclosure will be described with reference to the drawings.

Figure 1:
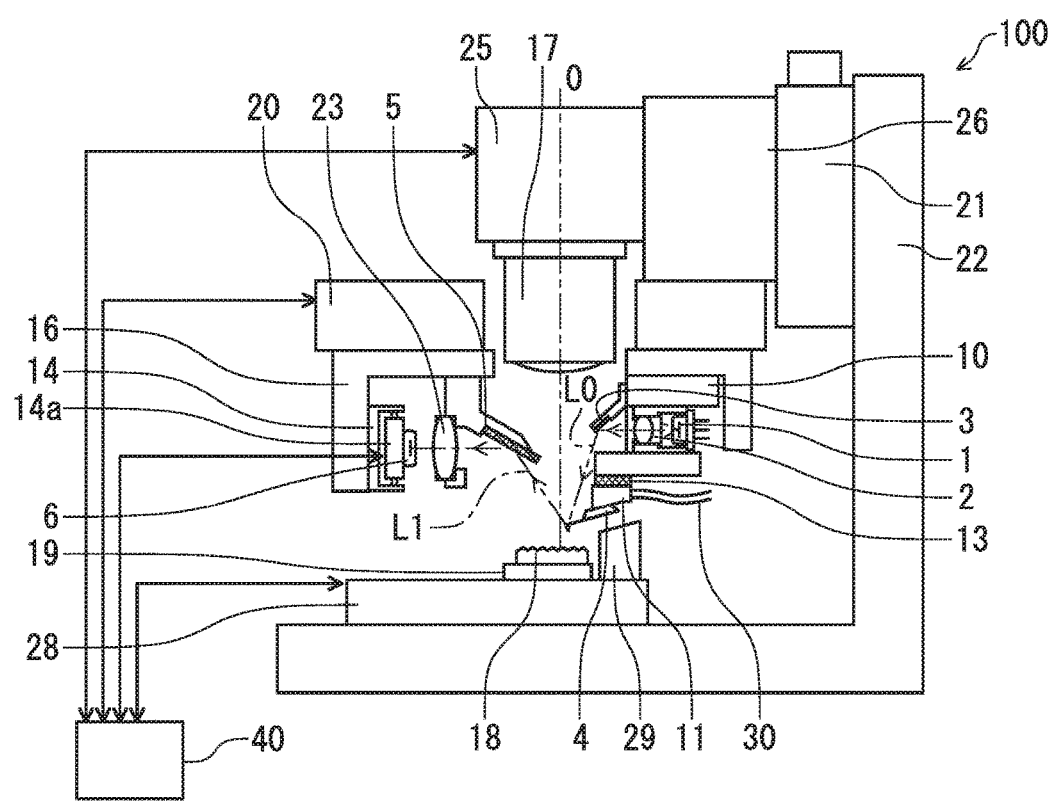
FIG. 1 is a block diagram illustrating a state where a scanning probe microscope according to an embodiment of the present disclosure is attached with a cantilever.
Figure 2:
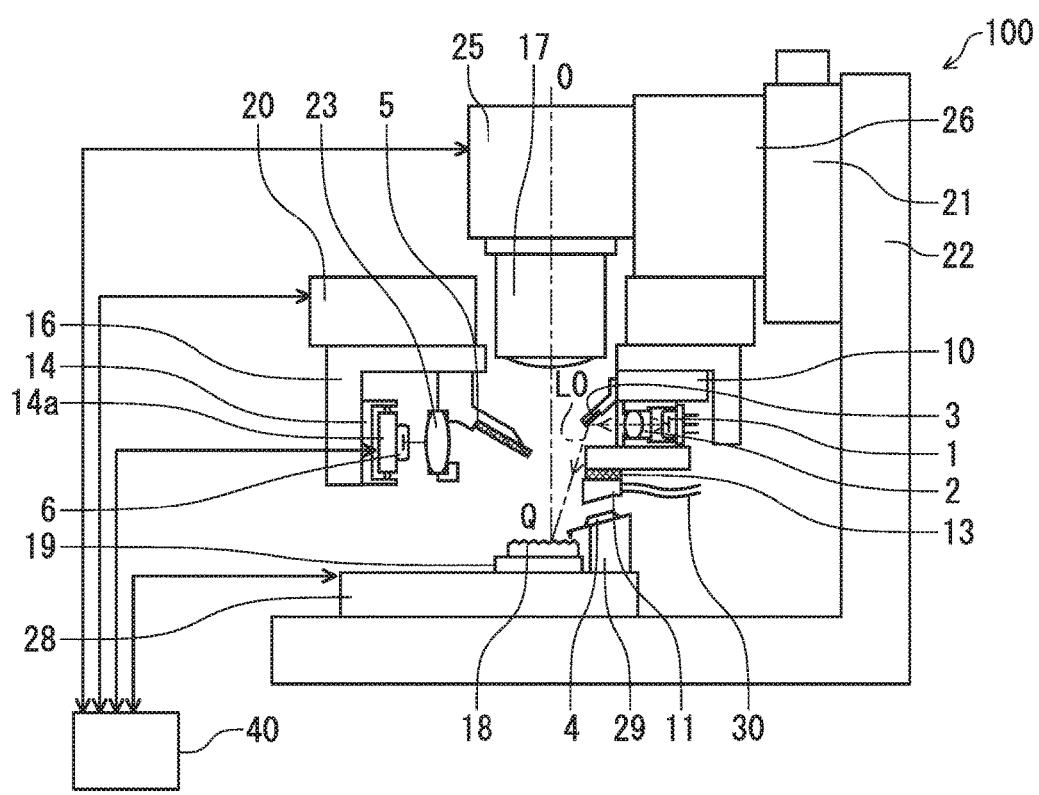
FIG. 2 is a diagram illustrating a light path obtained by imaging laser light emitted from a light source with an objective lens before the attachment of the cantilever.
Figure 3:
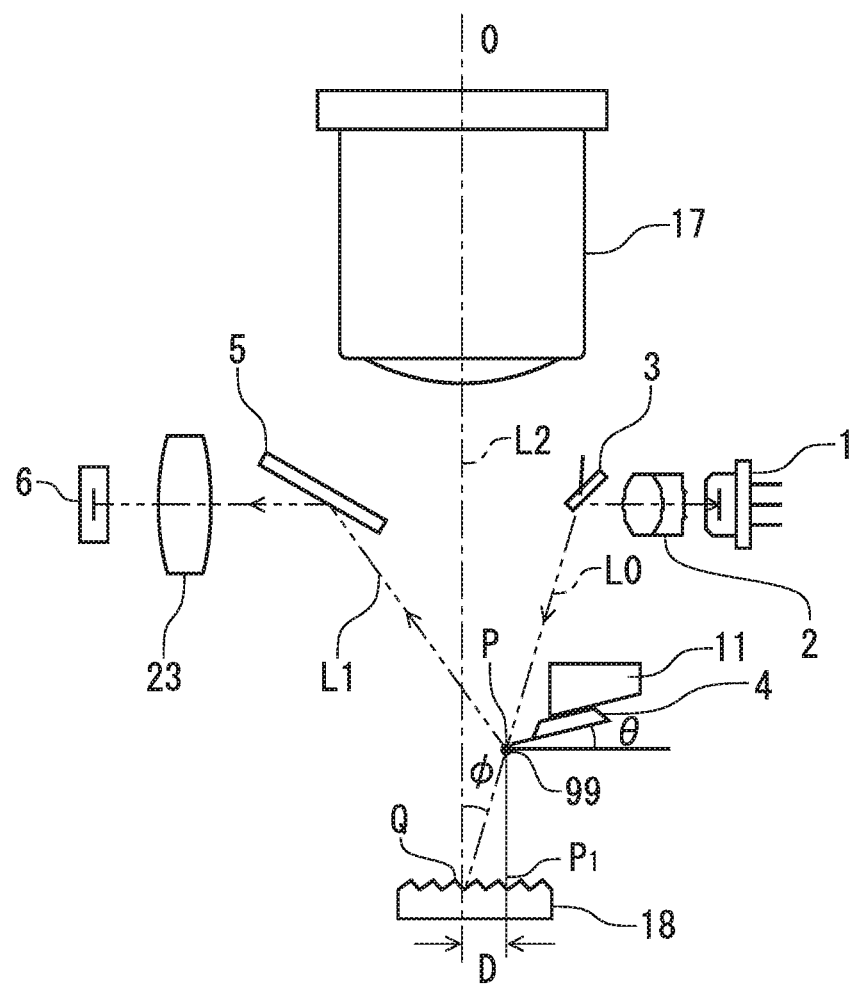
FIG. 3 is a partially enlarged diagram of FIG. 2.

FIG. 1 is a block diagram illustrating a state where a scanning probe microscope 100 according to an embodiment of the present disclosure is attached with a cantilever 4, FIG. 2 is a diagram illustrating a light path obtained by imaging laser light L0 emitted from a light source 1 with an objective lens 17 before the attachment of the cantilever 4, and FIG. 3 is an enlarged diagram partially illustrating the vicinity of the cantilever 4 of FIG. 2.

As shown in FIG. 1, the scanning probe microscope 100 includes the cantilever 4 having a probe 99 in the tip thereof to be approximate to the surface of a sample 18, a sample base (stage) 19 which is disposed under the cantilever 4 and on which the sample 18 is placed, the light source (semiconductor laser light source) 1 which emits the laser light (detection light) L0 used as an optical lever, a first reflecting portion (first mirror) 3, a detector (tetrametric photodetecting element) 6 which receives the laser light, a second reflecting portion (second mirror) 5, the objective lens 17 which is disposed to face the cantilever 4 and the sample 18, a controller 40, and the like. The objective lens 17 is a part of an optical microscope 25. The light condensed by the objective lens 17 is observed and imaged by the optical microscope 25.

The scanning probe microscope 100 is configured to be a type that the laser light L0 is emitted from the light source 1 obliquely to an optical axis O of the objective lens 17. The scanning probe microscope 100 is configured to be a level scan type which scans and measures the cantilever 4 side.

The light source 1 emits the laser light to the front side. The first reflecting portion 3 reflects the laser light L0 emitted by the light source 1 downward obliquely to the optical axis O, and provides the light to a reflecting surface (not illustrated) provided on the back surface of the cantilever 4. The second reflecting portion 5 reflects the laser light, which is reflected upward on the reflecting surface of the cantilever 4, to the front side, and leads the light to the detector 6. The detector 6 is disposed on the outside from the second reflecting portion 5, and a receiving surface is directed to the front side.

The controller 40 controls the operation of the scanning probe microscope 100, and includes a processor, a computer, and the like. The computer may include a controller board, a CPU (central processing unit), a memory such as a ROM, a RAM, and a hard disk, and various interfaces such as a user interface and a communication interface.

The sample base 19 is attached on an XY stage 28, and the XY stage 28 is fixed on a base portion (casing) 22. The XY stage 28 coarsely moves the sample base 19 in two dimensions on a horizontal plane to adjust a positional relation between the cantilever 4 and the sample 18, and is operated by the control of the controller 40. The sample 18 is mounted on the sample base 19, and the sample 18 is disposed to face the probe 99. A cantilever providing mechanism 29 holding a plurality of replacement cantilevers is disposed on the XY stage 28 (the replacement cantilevers are not illustrated).

The cantilever 4 is adsorbed and fixed to an oblique block 11 by a vacuum pipe 30 provided in the oblique block 11, and the oblique block 11 is fixed to a vibration exciter (vibrator) 13.

The oblique block 11 corresponds to a "cantilever supporting portion" in appended claims. In FIG. 1, the cantilever is attached to the oblique block 11 obliquely by an attachment angle θ (see FIG. 3) rising upward to the right side with respect to the horizontal plane (xy surface).

A displacement detection system and the oblique block 11 attached with the cantilever are integrated with each other to form an optical head in the scanning probe microscope 100. Specifically, a connecting portion 26 is attached on the side surface of the boom position of the base portion 22 in a vertical direction through a coarse movement mechanism 21.

A fine movement mechanism (scanner) 20 with an open center portion is attached on the under surface of the connecting portion 26. The frame-shaped optical head casing 16 with an open center portion is fixed on the under surface of the fine movement mechanism 20. The fine movement mechanism 20 three-dimensionally moves (finely move) the optical head casing 16, and is a flat scanner (actuator) including two (two axes of) piezoelectric elements which radiate the optical head casing 16 in respective xy (the plan surface of the sample 18) directions, and a piezoelectric element scanning the optical head casing 16 in a z (height) direction. The piezoelectric element is an element in which a crystal is distorted when an electric field is applied, and the electric field is generated when the crystal is forcibly distorted by an external force. PZT (lead zirconate titanate) as a type of ceramics can be generally used as the piezoelectric element; however, the piezoelectric element is not limited thereto.

A light source side module 10 is attached on the under surface of the optical head casing 16, and the light source 1 and a first condensing lens 2 are attached in the inner portion of the light source side module 10. The first reflecting portion 3 is attached to the light source side module 10 through a predetermined mirror holder.

The objective lens 17 is provided in the opening portion of the optical head casing 16 to face the cantilever 4 and the sample 18 on the lower side through the opening portion.

The coarse movement mechanism 21 coarsely moves the connecting portion 26 in the vertical (Z) direction, and operated by the control of the controller 40. The coarse movement mechanism 21 may be configured by, for example, a stepping motor.

The piezoelectric elements of the fine movement mechanism 20 are driven respectively in the xy directions and the z direction by a predetermined signal (voltage) sent from the controller 40.

The cantilever 4 includes a main body and a chip portion, and the chip portion contacting with the side surface of the main body configures a cantilever spring structure. The cantilever 4 is attached to the oblique block 11, and the oblique block 11 is fixed to the vibration exciter (vibrator) 13. The vibration exciter 13 is vibrated by an electric signal sent from an excitation power source (not illustrated), and vibrates the cantilever 4 and the probe 99 at the tip thereof. Examples of an excitation method of the cantilever include the piezoelectric element, an electric or magnetic field, a light radiation, and an energization of a current. The vibration exciter 13 is used when the shape of the sample is measured in a dynamic force mode (DFM measurement mode) in which the cantilever is forcibly vibrated in the vicinity of a resonant frequency.

The vibration exciter 13 is attached under the light source side module 10, and the cantilever 4 is disposed at the tip of the optical head.

A mirror holder is fixed on the lower side of the optical head casing 16 to face the light source side module 10, and the second reflecting portion 5 and a second condensing lens 23 are attached to the mirror holder. A two-axes adjustment stage 14 is attached to the optical head casing 16, and the detector 6 is attached to the two-axes adjustment stage 14 through a two-axes adjustment mechanism 14a. An "optical axis adjustment" in which the position of the detector 6 is adjusted to maximize a light-receiving intensity can be performed by adjusting the two-axes adjustment mechanism 14a in two directions of the Z direction and the Y direction (or the X direction).

In the embodiment, the two-axes adjustment mechanism 14a corresponds to a "detector movement mechanism" in appended claims. The two-axes adjustment mechanism 14a may be configured by, for example, the stepping motor.

The cantilever 4 attached to the tip of the fine movement mechanism 20 scans the sample 18 in the direction of the sample surface (XY) while controlling the position of the cantilever in the height (Z) direction. At this time, first, the cantilever 4 is positioned at an arbitrary position in the surface of the sample 18 by the XY stage 28, and then the cantilever 4 is sent to a height position to contact with or approach the sample 18 by the coarse movement mechanism 21.

An interatomic force acting between the sample 18 and the cantilever 4 is reflected in the change (incident position) of the light path of the laser incident on the detector 6 as the displacement quantity of the cantilever 4 in a bending direction. Accordingly, the displacement quantity of the cantilever 4 from the incident position is detected by the detector 6. The displacement of the cantilever 4 generated by the interatomic force acting between the sample 18 and the probe 99 is detected by the above-described mechanism in this manner, and the fine movement mechanism 20 is displaced in the z direction to control the interatomic force acting between the probe 99 and the sample 18 such that the damping factor of the vibration amplitude of the cantilever 4 is a target amplitude. The fine movement mechanism 20 is displaced in the xy directions in this state to scan the sample 18, and the surface shape and the physical property value are mapped in the DFM measurement mode.

In this manner, the displacement of the cantilever 4 when the probe 99 of the cantilever 4 approaches and contacts with the sample 18 is detected in the above-described optical lever type SPM, and the fine movement mechanism 20 can scan and measure the surface of the sample 18 while keeping the displacement quantity of the cantilever 4 constant.

The controller 40 controls each operation of the probe microscope 100, reads the measured data, and implements a surface-shape measurement, a surface physical property measurement, and the like. (i) A three-dimensional shape image from the height displacement, (ii) a phase image from the phase value in the resonant state, (iii) an offset signal image from the difference between the vibration amplitude and the target value, and (iv) a multi function measurement image from the physical property value between the probe and the sample are displayed on the controller 40 with respect to the displacement in the xy plane, and an analysis and a process thereof are performed and thus the probe microscope is operated.

Next, the optical axis adjustment as a distinguishing portion of the present disclosure will be described with reference to FIGS. 2 and 3.

FIG. 2 illustrates the light path obtained by imaging the laser light L0 emitted from the light source 1 with the objective lens 17 in a state where the cantilever 4 is not yet attached to the oblique block 11 (that is, a state where the cantilever 4 is held by the cantilever providing mechanism 29 on the XY stage 28). The laser light L0 is reflected at a point Q on the surface of the sample 18, is incident along the optical axis O of the objective lens 17, and is imaged as a spot light by an imaging device (CCD element) of the optical microscope 25 (see FIG. 4).

As illustrated in FIG. 3, the laser light L0 emitted from the light source 1 is reflected at an intersection point P with the reflecting surface of the cantilever 4, is incident on the second reflecting portion 5 as reflecting light L1, and is detected by the detector 6 in a state where the cantilever 4 is attached to the oblique block 11.

A point P1 obtained by projecting the intersection point P on the surface of the sample 18 is not matched with the point Q, and is deviated by a displacement D, and further, the spot light (reflecting light L1) of the laser light L0, which is emitted on the cantilever 4, at the intersection point P cannot be imaged since the spot light is beyond the coverage of the objective lens 17. Since the attachment angle θ and the incident angle (an angle to be the optical axis O) φ of the laser light L0 have been already known, the coordinate of the intersection point P (that is, a position where the cantilever 4 is attached to the oblique block 11) is geometrically determined when the coordinate of the point Q is known, and thus the optical axis adjustment can be performed.

Figure 4:
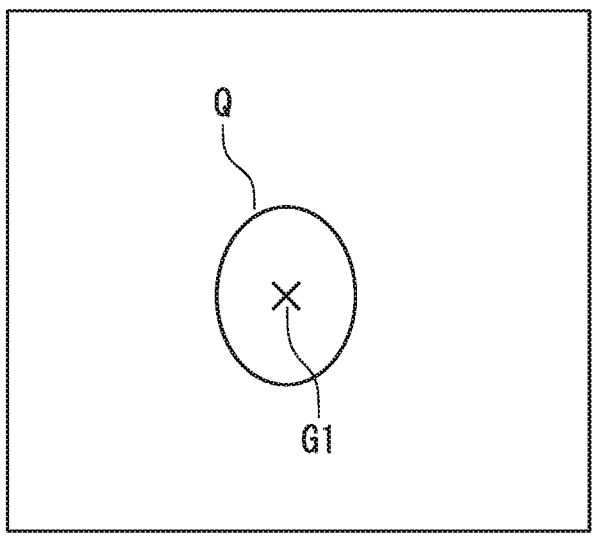
FIG. 4 is a diagram schematically illustrating an aspect of detecting a spot position of the laser light imaged with the objective lens.
Figure 5:
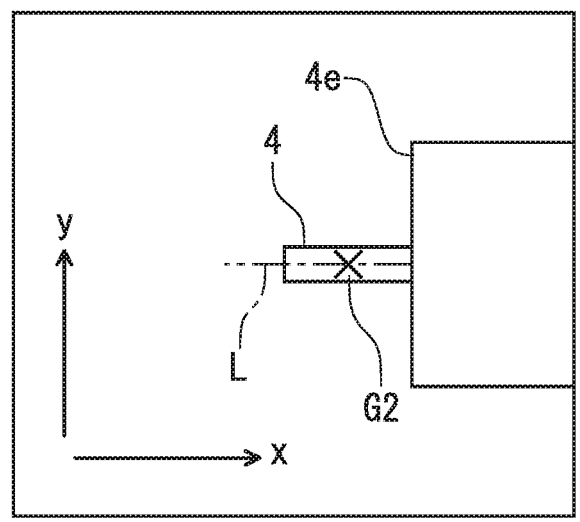
FIG. 5 is a diagram schematically illustrating an aspect of detecting a position of the cantilever imaged with the objective lens.

Specifically, first, as illustrated in FIG. 4, the controller 40 images the spot light of the laser light L0 reflected at the point Q of the surface of the sample 18 with the objective lens 17, and detects a spot position (a centroid G1 of the spot light in FIG. 4) of the laser light L0 through the image processing in a state where the cantilever 4 is not attached to the oblique block 11 (spot position detecting process; S100 in FIG. 6). Next, as illustrated in FIG. 5, in a state where the cantilever 4 is not attached to the oblique block 11 (that is, the cantilever 4 is held by the cantilever providing mechanism 29), the controller 40 does not emit the laser light L0, images the cantilever 4 with the objective lens 17, and detects the position of the cantilever 4 (a centroid G2 of the cantilever 4 in FIG. 5) through the image processing (cantilever position detecting process; S14 in FIG. 6). The centroid G2 can be obtained, for example, by extracting the contour of the cantilever 4 through the image processing.

The reason why the process of FIG. 5 is performed is that the movement amount of the cantilever 4 to the target intersection point P cannot be calculated when the present position of the cantilever 4 held by the cantilever providing mechanism 29 is not detected.

In the process flow of FIG. 5, the cantilever 4 may be held obliquely in the movement direction of the cantilever (the x direction or the y direction of the fine movement mechanism 20 moving the cantilever 4) by the cantilever providing mechanism 29, and a center axis (extended line of a long axis L of the cantilever 4) of the cantilever 4 in a length direction or an edge 4e may be not perpendicular to the x direction or the y direction. In this case, it is difficult to accurately move the cantilever 4 to the intersection point P since the cantilever 4 moves obliquely to the x direction or the y direction. The cantilever 4 can be accurately moved to the intersection point P by detecting the deviation angle between the x direction or y direction and the direction of the long axis L of the probe 99, or the deviation angle between the x direction or y direction and the edge 4e.

The direction of the long axis L of the cantilever 4 is perpendicular to the edge 4e of the cantilever (main body) 4 connected to the base portion of the cantilever 4, or has a known angle with respect to the edge 4e, and thus the direction of the long axis L can be detected by extracting the edge 4e through the image processing.

As described above, the controller 40 geometrically calculates the position, where the cantilever 4 is attached to the oblique block 11 such that the laser light L0 is reflected at the intersection point P on the reflecting surface of the cantilever 4 when the cantilever 4 is attached to the oblique block 11, based on a spot position G1 of the laser light L0, a position G2 of the cantilever 4, the incident angle φ of the laser light L0, and the attachment angle θ (cantilever attachment position calculating process; S16 in FIG. 6).

The controller 40 controls the coarse movement mechanism 21 such that the cantilever 4 moves (falls down) to the above-described attachment position, brings the oblique block 11 close to the cantilever providing mechanism 29 by moving the oblique block in the Z direction, and further brings the oblique block 11 into contact with the cantilever 4. The coarse movement mechanism 21 corresponds to a "movement mechanism" in appended claims. Since the cantilever providing mechanism 2 and the cantilever 4 have a known height, the coarse movement mechanism 21 may be controlled to have the height.

The controller 40 controls a valve of the vacuum pipe 30 such that the cantilever 4 is attracted and attached to the oblique block 11 (cantilever attaching process; S18 in FIG. 6). Accordingly, the optical axis adjustment, in which the laser light L0 is reflected on the reflecting surface of the cantilever 4, can be automatically performed.

The adjustment of the optical lever is completed by adjusting the intensity of the output signal (ADD signal) sent from the detector 6, and the longitudinal bending (DIF) signal and the lateral twist (FMM) signal of the cantilever 4, and performing an alignment between the reflecting surface of the cantilever and the detector 6.

The optical axis adjustment of the detector 6 is generally performed by an operator, but automatic operation of the controller 40 will also be described below.

Next, the process flow of the spot position detection performed by the controller 40 will be described with reference to FIGS. 6 to 8.

Figure 6:
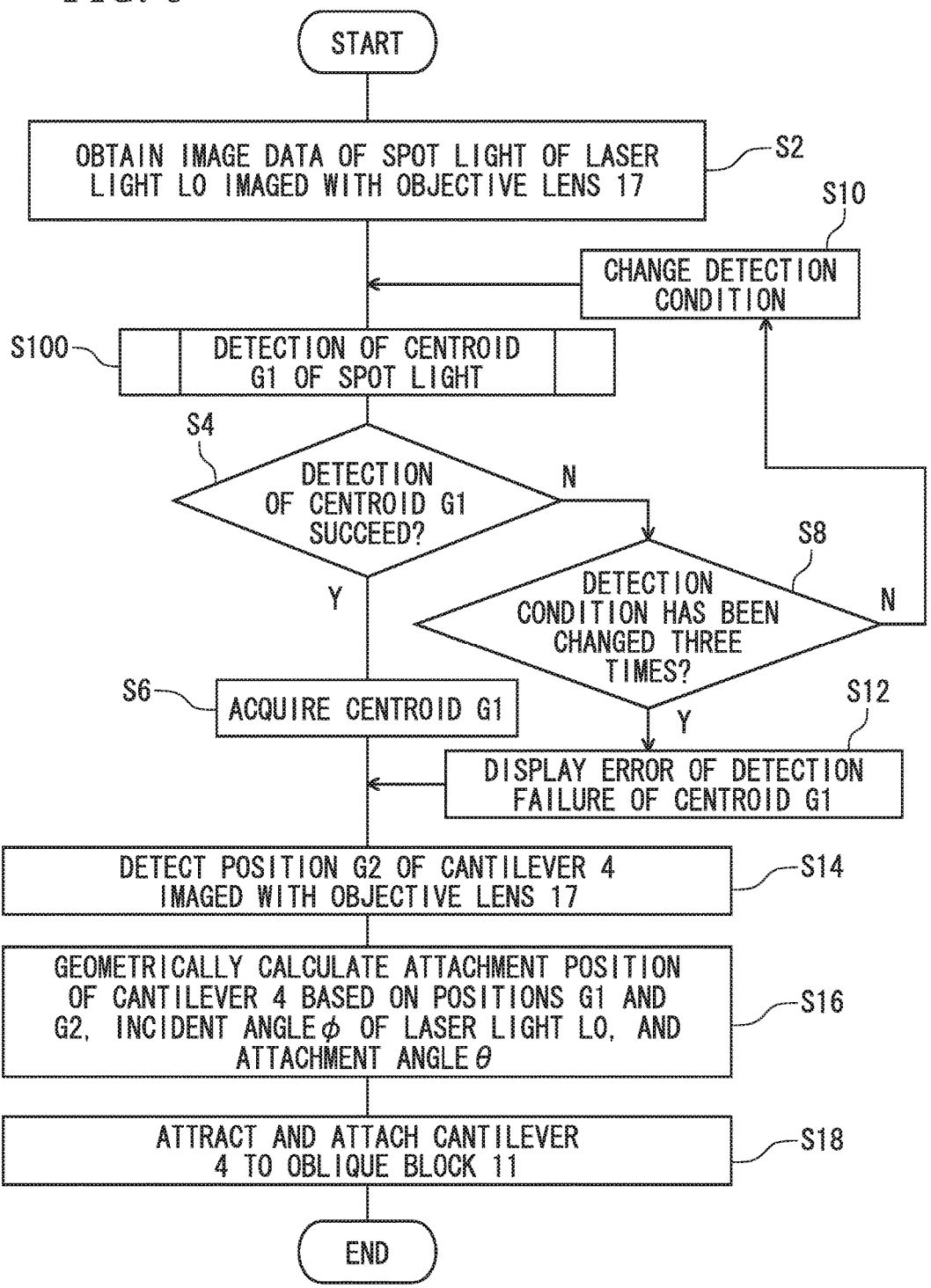
FIG. 6 is a diagram illustrating a process flow of detecting a centroid of spot light of the laser light.
Figure 7:
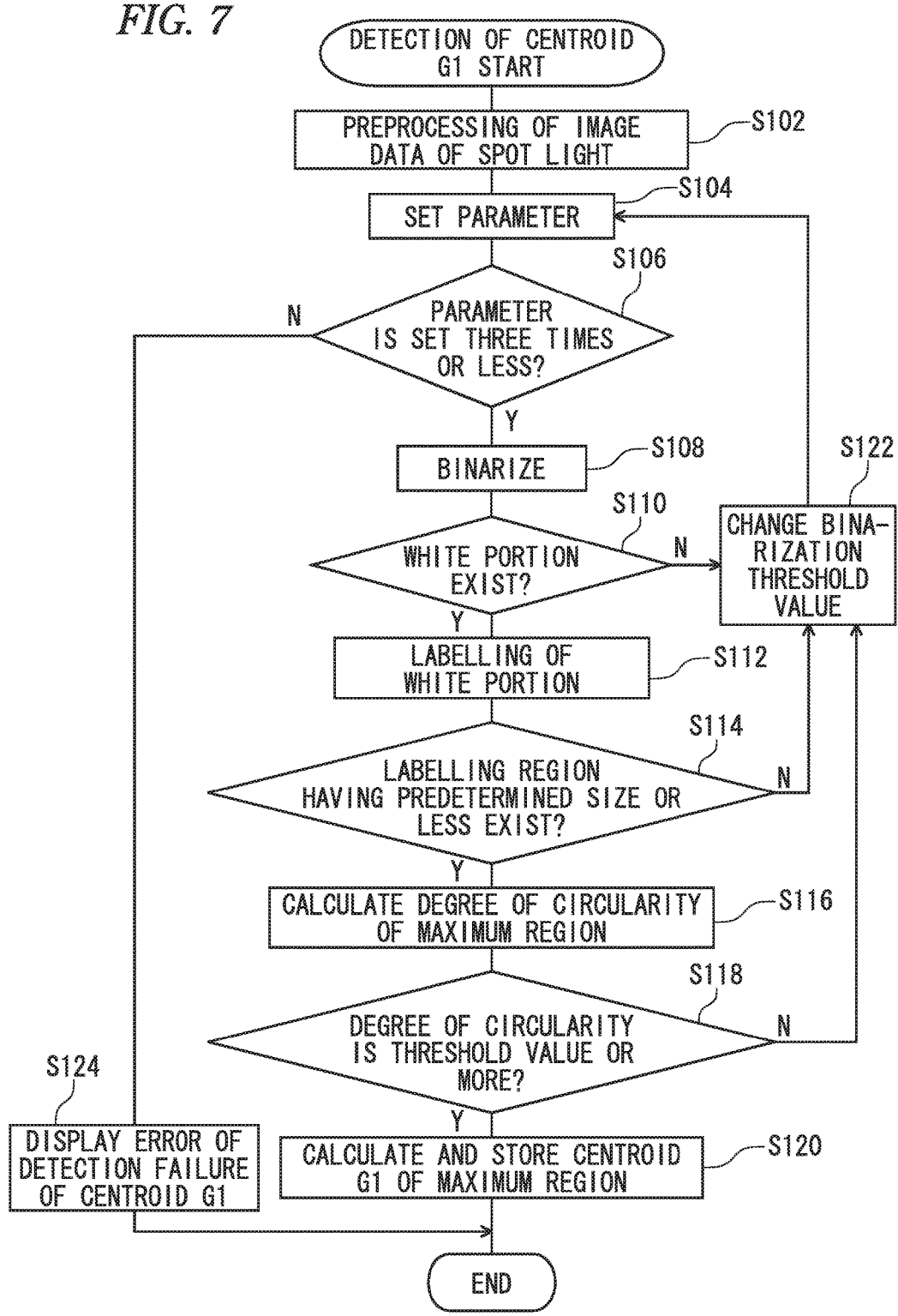
FIG. 7 is a diagram illustrating a subroutine of detecting the centroid of the spot light.

FIG. 6 is a process flow of detecting the centroid G1 of the spot light of the laser light L0, and FIG. 7 illustrates a subroutine of detecting the centroid G1 of the spot light.

In FIG. 6, the controller 40 obtains the image data of the spot light of the laser light L0 imaged with the objective lens 17 (and the optical microscope 25) (Step S2: image acquisition process), and detects the centroid G1 though the image processing (Step S100: spot position acquisition process). Next, in Step S4 (spot position acquisition determining process), the controller 40 determines whether the detection in Step S100 succeeds, acquires the centroid G1 in the case of "Yes" (Step S6), and ends the process.

In the case of "No" in Step S4, next, it is determined in Step S8 that the controller 40 determines whether the detection condition in Step S100 has been changed three times. In the case of "Yes" in Step S8, the detection of the centroid G1 is considered undesirable, an error indicating that the detection of the centroid G1 is failed is displayed (Step S12), and the process is ended. In the case of "No" in Step S8, the detection condition is changed (Step S10), and the procedure returns to Step S100.

Examples of the change of the detection condition include the change of a threshold value used when the image is binarized into black and white images.

Next, the subroutine of detecting the centroid G1 in FIG. 7 will be described. First, the controller 40 appropriately performs preprocessing (the change of a size, the conversion into a gray scale, and the like) on the image data of the spot light acquired in Step S2 (Step S102: preprocessing process). Next, the controller 40 sets various parameters used for the image processing (Step S104). Examples of the various parameters include the threshold value of a binarizing process to be described below.

Next, in Step S106, the controller 40 determines whether the parameter of Step S104 is set three times or less. In the case of "No" in Step S106, the setting of the parameter is considered not to be excellent, an error indicating that the detection of the centroid G1 is failed is displayed (Step S124), and the process is ended. In the case of "Yes" in Step S106, the controller 40 binarizes the image data (Step S108: binarizing process).

Next, the controller 40 determines whether a white portion (a portion exceeding a binarization threshold value) is present in the binarized image data (Step S110). In the case of "Yes" in Step S110, the controller 40 labels the white portion (Step S112). The labeling is a well-known image processing, and the same number is assigned to pixels where the white portion is continuous. The controller 40 determines whether a labeling region having a predetermined size or less is present in the image data (Step S114). In the case of "Yes" in Step S114, a degree of circularity of the maximum region in the labeling region is calculated (Step S116: circularity calculating process). The labeling region exceeding a predetermined size is considered to include a noise and the like, and thus the process in Step S114 is to eliminate the noise and the like. The predetermined size means a labeling region, for example, where the number of the pixels exceeds one hundred.

Figure 8:
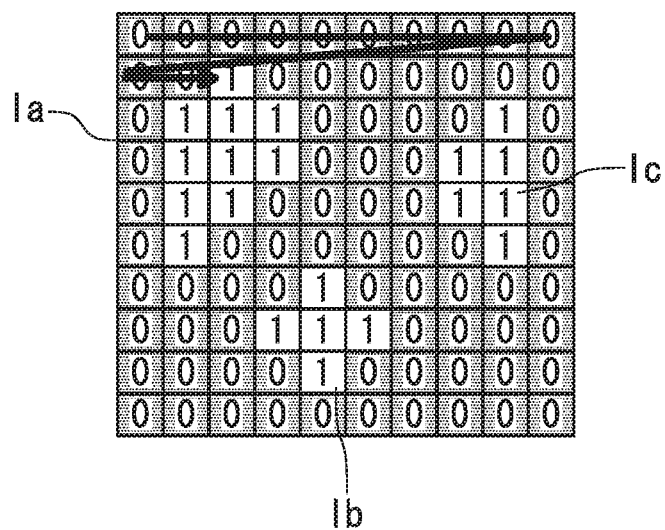
FIG. 8 is a diagram illustrating an example in which the image data of the spot light is labeled.

In the example illustrated in FIG. 8, three labeling regions Ia to Ic where the white portion is continuous are present in the image data, the region Ia is the largest (including the most white pixels) there among, and thus a degree of circularity of the region Ia is calculated. A degree of circularity is also calculated by a well-known image processing from an area S (the number of the pixels) of the region Ia and a circumference length PL by a formula of a degree of circularity=$(4\pi \times S)/(PL \times PL)$ in the example illustrated in FIG. 8.

Steps S104 to S116 correspond to a "spot region determining process".

Next, the controller 40 determines whether the degree of circularity calculated in Step S116 is the threshold value or more (Step S118: circularity determining process). The incidence of the laser light L0 is considered to be abnormal in a case where the spot light has an awkward shape differed from a circle, and thus it can be determined through the determination of Step S118 whether the laser light L0 is normally incident. The threshold value of the degree of circularity can be set, for example, to 50%.

In the case of "Yes" in Step S118, the controller 40 calculates the centroid of the region Ia, stores the result in a predetermined storage unit (Step S120), and ends the process. The calculation of the centroid through the image processing is well-known, and the coordinate of the centroid is obtained from the average of X coordinates of the pixels configuring the region Ia and the average of Y coordinates.

In the case of "No" in any one of Steps S110, S114, and S118, the binarization threshold value is changed (Step S122), and the procedure returns to Step S104.

In the case of "No" in Step S110, the binarization threshold value is set to be lower since the threshold value is too high to detect the white portion. In the case of "No" in Steps S114 and S118, the binarization threshold value is set to be higher since the threshold value is too low for the detection of the white portion.

The present disclosure is not limited to the above-described embodiment. For example, the measurement mode of the scanning probe microscope is not limited, and a contact mode of measuring the surface shape of the sample while keeping the interatomic force between the probe and the sample constant, or non-contact measurement mode may be exemplarily described in addition to the above-described DFM measurement mode.

The scanning probe microscope is not limited to measure the surface shape of the sample, and may measure various physical property information of the sample as long as the scan is performed with the probe 4 caused to approach or contact with the sample.

The type of the light source, the detection light, the detector, the movement mechanism, the objective lens, and the method of attaching the cantilever to the cantilever supporting portion are not limited to the embodiment. A sample scan type may be adopted in which the cantilever 4 is fixed, and a scan is performed on the sample 18 side.

The centroid G1 of the spot light and the centroid G2 of the cantilever 4 are detected respectively as a spot position and a position of the cantilever in the embodiment, but the present disclosure is not limited thereto. For example, a tip point of the probe 99 may be assumed and detected as a position of the cantilever.

The controller 40 may control the two-axes adjustment mechanism 14a such that the light-receiving intensity of the reflecting light L1 (see FIGS. 1 and 3) detected by the detector 6 is maximized (light detection side adjusting process). Accordingly, also the optical axis adjustment of the detector 6 is automatically performed. In this case, the optimal position of the detector 6 is obtained by performing a feedback control on the movement amount of the two-axes adjustment mechanism 14a according to the magnitude of the light-receiving intensity at the time of operating the two-axes adjustment mechanism 14a.

When the spot position of the spot light is detected, a predetermined spot reflecting surface (mirror) may be provided to image the reflecting light, which emits the detection light on the reflecting surface, as the spot light instead of emitting the detection light on the sample 18. For example, the intensity of the reflecting light L2 from the surface of the sample 18 is not sufficient in the sample 18 having some types or surface conditions, but the reflecting light from the spot reflecting surface (mirror) has an effect that it is easy to image the spot light and to perform the optical axis adjustment since the reflecting light can be ensured to have the constant intensity.

The number of the changes of the detection condition or the parameter setting is three in Step S8 in FIG. 6 or Step S106 in FIG. 7 in the embodiment, but the number may be set arbitrary.

As described with reference to the embodiments, the scanning probe microscope of the present disclosure may include: a cantilever provided with a probe to be approximate to a surface of a sample; a cantilever supporting portion that supports the cantilever at a predetermined attachment angle with respect to a horizontal plane; a movement mechanism configured to adjust a position of the cantilever; a light source configured to emit detection light; a detector configured to detect the detection light reflected on a reflecting surface provided in the cantilever and to detect a displacement of the cantilever; an objective lens provided to face the cantilever and configured to observe or image a vicinity of the cantilever; and a controller configured to detect a spot position of spot light of the detection light imaged with the objective lens in a state where the cantilever is not attached to the cantilever supporting portion, then to detect a position of the cantilever imaged with the objective lens, and to control the movement mechanism based on the spot position, the position of the cantilever, an incident angle of the detection light, and the attachment angle such that the detection light is reflected on the reflecting surface when the cantilever is attached to the cantilever supporting portion.

According to the scanning probe microscope, the controller geometrically auto-calculates a position, where the cantilever is attached to the cantilever supporting portion such that the detection light is reflected on the reflecting surface of the cantilever, based on the position of the cantilever, the incident angle of the detection light, and the attachment angle. The controller attaches the cantilever to the cantilever supporting portion while controlling the movement mechanism such that the cantilever moves to the attachment position. Therefore, the optical axis adjustment of the optical lever is automatically performed with an objective lens.

The controller may detect the spot position when a shape of the spot light imaged with the objective lens has a predetermined degree of circularity or more.

The incidence of the detection light is considered to be abnormal in a case where the spot light has an awkward shape that differs from a circle. The scanning probe microscope can determine whether the detection light is normally incident.

The scanning probe microscope may further include a detector movement mechanism configured to adjust a position of the detector. The controller may control the detector movement mechanism such that an intensity of the detection light detected by the detector is maximized.

The scanning probe microscope can automatically perform the optical axis adjustment of the detector.

The controller may detect a centroid of the spot light imaged with the objective lens as the spot position and detects a centroid of the cantilever and a direction of a long axis of the cantilever as the position of the cantilever.

The cantilever moves obliquely to the movement direction in a case where the cantilever is held obliquely in the movement direction of the cantilever by the cantilever providing mechanism, and thus it is difficult to accurately move the cantilever to the attachment position. The cantilever can be accurately moved to the attachment position by detecting the deviation angle between the movement direction of the cantilever and the direction of the long axis of the cantilever.

According to the present disclosure, there is also provided s an optical axis adjustment method for the scanning probe microscope which includes: a cantilever which is provided with a probe to be approximate to a surface of a sample; a cantilever supporting portion that supports the cantilever at a predetermined attachment angle with respect to a horizontal plane; a movement mechanism which adjusts a position of the cantilever; a light source which emits detection light; a detector which detects the detection light reflected on a reflecting surface provided in the cantilever and to detect a displacement of the cantilever; and an objective lens which is provided to face the cantilever and configured to observe or image a vicinity of the cantilever. The optical axis adjustment method includes: detecting the spot position of spot light of the detection light imaged with the objective lens in a state where the cantilever is not attached to the cantilever supporting portion; detecting a position of the cantilever imaged with the objective lens; geometrically calculating an attachment position of the cantilever based on the spot position, the position of the cantilever, an incident angle of the detection light, and the attachment angle such that the detection light is reflected on the reflecting surface when the cantilever is attached to the cantilever supporting portion; and attaching the cantilever to the cantilever supporting portion by controlling the movement mechanism such that the cantilever moves to the attachment position.

According to the optical axis adjustment method for the scanning probe microscope, a position where the cantilever is attached to the cantilever supporting portion such that the detection light is reflected on the reflecting surface of the cantilever is geometrically auto-calculated based on the position of the cantilever, the incident angle of the detection light, and the attachment angle. The cantilever is attached to the cantilever supporting portion while controlling the movement mechanism such that the cantilever moves to the attachment position. Therefore, the optical axis adjustment of the optical lever is automatically performed with the objective lens.

According to the optical axis adjustment method for the scanning probe microscope of the present disclosure, the detection of the spot position may include acquiring image data of the spot light; acquiring a centroid of the spot light as the spot position through image processing; and determining whether the spot position is acquired.

According to the optical axis adjustment method of the scanning probe microscope, the spot position can be reliably acquired again, for example, by changing the detection condition of the spot light in a case where the spot position cannot be acquired.

The acquisition of the spot position may include: preprocessing the image data acquired through the image acquisition process; and determining a region of the spot light from the image data.

According to the optical axis adjustment method of the scanning probe microscope, the spot position can be accurately acquired by eliminating a noise within the region of the spot light.

The determination of the spot region may include: a binarizing process of binarizing the preprocessed image data; calculating a degree of circularity of a maximum region in the binarized image data; and determining whether the degree of circularity exceeds a threshold value to acquire the degree of circularity as the centroid of the spot light in a case where the degree of circularity is the threshold value or more.

The incidence of the detection light is considered to be abnormal in a case where the spot light has an awkward shape differing from a circle. According to the optical axis adjustment method of the scanning probe microscope, it can be determined whether the detection light is normally incident.

According to the present disclosure, the optical axis adjustment of the optical lever is automatically performed by using the objective lens disposed in the scanning probe microscope.

What is claimed is:

1. A scanning probe microscope comprising:
a cantilever that includes a reflecting surface that reflects light and a probe to be approximate to a surface of a sample;
a cantilever supporting portion to which the cantilever is attached and supports the cantilever at a predetermined attachment angle with respect to a horizontal plane;
a movement mechanism that moves a position of the cantilever;
a light source that emits detection light;
a detector that receives the detection light reflected on the reflecting surface of the cantilever and detects a position and a displacement of the cantilever based on the received detection light;
an objective lens that is provided at a position facing the cantilever and the sample for capturing an image of a vicinity of the cantilever through the objective lens; and
a controller that controls the movement mechanism to perform a process including: detecting a spot position of a spot light of the detection light captured through the objective lens in a state where the cantilever is not attached to the cantilever supporting portion only when a shape of the spot light captured through the objective lens has a predetermined degree of circularity or more;
detecting a position of the cantilever from an image captured through the objective lens; and
controlling the movement mechanism based on the spot position, the position of the cantilever, an incident angle of the detection light, and the attachment angle such that the detection light is reflected on the reflecting surface when the cantilever is attached to the cantilever supporting portion,
wherein the controller detects a centroid of the spot light captured by the objective lens as the spot position and detects a centroid of the cantilever and a direction of a long axis of the cantilever as the position of the cantilever.

2. The scanning probe microscope according to claim 1 further comprising:

a detector movement mechanism that adjusts a position of the detector,
wherein the controller controls the detector movement mechanism to move the detector to a position at which an intensity of the detection light detected by the detector is maximized.

3. An optical axis adjustment method for a scanning probe microscope including:
a cantilever that includes a reflecting surface that reflects light and a probe to be approximate to a surface of a sample;
a cantilever supporting portion to which the cantilever is attached and supports the cantilever at a predetermined attachment angle with respect to a horizontal plane;
a movement mechanism that moves a position of the cantilever;
a light source that emits detection light;
a detector that receives the detection light reflected on the reflecting surface of the cantilever and detects a position and a displacement of the cantilever based on the received detection light; and
an objective lens that is provided at a position facing the cantilever and the sample for capturing an image of a vicinity of the cantilever through the objective lens,
wherein the method comprises:
detecting a spot position of a spot light of the detection light captured through the objective lens in a state where the cantilever is not attached to the cantilever supporting portion;
detecting a position of the cantilever from an image captured through the objective lens; and
geometrically calculating an attachment position of the cantilever based on the spot position, the position of the cantilever, an incident angle of the detection light, and the attachment angle such that the detection light is reflected on the reflecting surface when the cantilever is attached to the cantilever supporting portion; and
attaching the cantilever to the cantilever supporting portion by controlling the movement mechanism such that the cantilever moves to the attachment position,
wherein the detection of the spot position includes:
acquiring image data of the spot light;
acquiring a centroid of the spot light as the spot position by performing image processing; and
determining whether the spot position is acquired,
wherein the acquiring of the spot position includes:
preprocessing the acquired image data; and
determining a region of the spot light from the image data, and
wherein the determining of the region includes:
binarizing the preprocessed image data;
calculating a degree of circularity of a maximum region in the binarized image data;
determining whether the degree of circularity exceeds a threshold value; and
acquiring the degree of circularity as the centroid of the spot light in a case where the degree of circularity is equal to or greater than a threshold.

* * * * *